United States Patent
Price et al.

(10) Patent No.: US 6,991,593 B2
(45) Date of Patent: Jan. 31, 2006

(54) HAZARDOUS WASTE STABILIZATION METHODS, PRODUCTS AND TESTING PROCEDURES

(75) Inventors: Kenneth S. Price, Zionsville, IN (US); Joe Kurek, Indianapolis, IN (US); Kurt Whitfield, Indianapolis, IN (US); Herbert I. Wissel, Indianapolis, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 0 days.

(21) Appl. No.: 10/309,834

(22) Filed: Dec. 4, 2002

(65) Prior Publication Data

US 2003/0185630 A1    Oct. 2, 2003

Related U.S. Application Data

(60) Provisional application No. 60/338,641, filed on Dec. 5, 2001.

(51) Int. Cl.
 *B09B 1/00*    (2006.01)
(52) U.S. Cl. .................... 588/252; 588/256; 588/260
(58) Field of Classification Search ............... 588/252, 588/236, 256, 260
 See application file for complete search history.

(56) References Cited

U.S. PATENT DOCUMENTS

| | | | |
|---|---|---|---|
| 4,370,233 A | 1/1983 | Hayes et al. | |
| 4,671,882 A | 6/1987 | Douglas et al. | |
| 4,680,126 A | 7/1987 | Frankard et al. | |
| 4,943,377 A | 7/1990 | Legare, III | |
| 5,397,478 A * | 3/1995 | Pal et al. | 210/710 |
| 5,431,825 A * | 7/1995 | Diel | 210/719 |
| 5,527,982 A | 6/1996 | Pal et al. | |
| 5,569,152 A * | 10/1996 | Smith | 588/256 |
| 5,569,155 A | 10/1996 | Pal et al. | |
| 5,605,417 A * | 2/1997 | Englert et al. | 405/128.75 |
| 5,859,306 A | 1/1999 | Stanforth | |
| 5,877,393 A * | 3/1999 | Webster | 588/236 |
| 5,916,123 A | 6/1999 | Pal et al. | |
| 6,403,044 B1 * | 6/2002 | Litz et al. | 423/101 |

* cited by examiner

*Primary Examiner*—John Kreck
(74) *Attorney, Agent, or Firm*—Baker & Daniels LLP (57) ABSTRACT

A process for the stabilization of metal bearing waste is provided that is based upon the discovery that landfills have anaerobic environments. This process includes adjusting the pH of the waste and adding a sulfide containing reducing agent to the waste to achieve a reducing environment. In one embodiment, electric arc furnace dust is stabilized for landfill disposal. Also provided is a method for a determination of landfilled waste leachability. This method is performed under conditions that simulate the chemical characteristics of landfills. In one embodiment, stabilized metal bearing waste is deoxygenated and a simulated leachate is prepared under anaerobic conditions.

31 Claims, 3 Drawing Sheets

THEORETICAL DEGRADATION CURVES

THEORETICAL DEGRADATION CURVES

FIGURE 3

HAZARDOUS WASTE STABILIZATION METHODS, PRODUCTS AND TESTING PROCEDURES

RELATED APPLICATION

This application is based on and claims priority to U.S. Provisional Patent Application Ser. No. 60/338,641, filed Dec. 5, 2001, the complete disclosure of which is expressly incorporated herein by reference.

FIELD OF THE INVENTION

The present invention relates generally to the field of waste treatment and analysis. More specifically the invention relates to the field of metal bearing waste stabilization, analysis and landfill disposal.

BACKGROUND OF THE INVENTION

The search for environmentally responsible disposal techniques of waste products has been problematic in the past, and is likely to continue to be a significant issue in the future. The United States Environmental Protection Agency ("EPA") in its February 1989 "Agenda for Action" estimated the annual generation of municipal solid wastes will increase from 160 million tons in 1988 to 193 million tons by the year 2000. Further, many industrial wastes are not amenable to thermal, chemical, or biological destruction. When these wastes cannot be reused or recycled in any beneficial, economical way, there is no other recourse but land disposal or landfilling. The decision to landfill waste depends on the characteristics of the waste, complicated environmental regulations and economic considerations.

Roughly half of the Electric Arc Furnace ("EAF") dust generated today is destined for a landfill. The composition of EAF dust, especially dust with low levels (less than about 15%) of zinc, makes it costly to recycle or to dispose of by conventional non-landfill methods. Since these alternatives are not economical, the default alternative, landfilling, is often the method of choice. Currently, it costs approximately $100.00 to $150.00 a ton to process and dispose of EAF waste. EAF dust is generated at 0.4 to 3.2% of the steel produced. This represents, on average, an additional $2.25 per ton for every ton of steel manufactured.

Another waste source arises when ferrous metal products are commonly rendered corrosion resistant by the application of electroplate coatings of non-ferrous metals such as zinc, nickel, copper, cadmium, and chromium. Zinc is the metal which is predominantly employed for electroplating. Presently, more than 40% of the plating shops in the United States electroplate zinc from a variety of plating baths.

Each year, zinc plating operations in the United States generate five billion gallons of waste water contaminated with zinc, which must be removed prior to release of the waste water into the environment. The majority of zinc platers currently employ conventional waste water treatment techniques for the removal of zinc which yield a toxic metal sludge. Even when highly concentrated, this sludge is not reusable in plating baths, since it contains substantial amounts of iron and the water hardness factors, calcium, and magnesium salts. Therefore, the sludge must be packaged in containers and shipped to environmentally secured landfill sites after chemical treatment. The total cost of such safe, permanent disposal is very high. In fact, it can equal or exceed the value of the chemicals used in the plating process.

Most of the costs associated with the disposal of these industrial wastes are a result of regulations promulgated to protect the environment. Generally speaking, these regulations are concerned with the containment of the landfilled waste. The most significant concern in landfill waste containment is potential leaching of the waste from its containment area into migrating water.

Leaching occurs when ground or surface water (migrating water) contacts or passes through a material and dissolves a constituent of the material at some finite rate. The water, prior to passing through the material is called leachant and the contaminated water that has passed through the waste, the leachate. The capacity of the waste material to leach is called its leachability. The concern over leaching for the environment relates to the rate at which hazardous and other undesirable constituents are removed from the waste and the environment via the leachate. This rate is usually estimated and expressed, however, in terms of concentration of the constituents in the leachate derived from a given test method. Concentration in the leachate is important because it determines the constituents' effects on living organisms, especially humans. When evaluating a material for leachability, the concentration of the hazardous constituents in the leachate are compared to either a specific concentration amount or to that in the original waste or both.

Material solubility and migrating water greatly influence the fate of compounds in the environment and therefore leachability. Highly soluble compounds readly distribute by way of the hydrologic cycle, do not bind readily to sediment, and bio-accumulate less rapidly than less soluble lipophilic chemicals. Factors influencing solubility include the degree of ionization of the compound, its oxidation state, the pH, and mineral content of the medium. Therefore, the behavior in the environment depends, in part, upon whether a hazardous compound or element is in an oxidized or non-oxidized state.

Some individual metal elements may have many different oxidation states; they are designated as metals because of the characteristics they display as a pure phase. In the zero oxidation state, each metal element is electrically neutral, however it may readily share electrons with surrounding atoms. The resulting solid may conduct electricity, or have a shiny appearance, and often has the great strength that makes metals such useful materials. Metals are oxidized when electrons are removed from the atoms (typically by molecular oxygen, hence the name for the process). The resulting ion may become part of a crystalline oxide, or may dissolve in water. These ionized species are often soluble in water because water molecules are electric dipoles: one end has a slight negative charge, and one is slightly positive. Thus, a chunk of zinc metal is immobile in the soil, but may dissolve as oxidized zinc ions which migrate easily into the leachate if exposed to an oxidizing agent.

Alternatively, ions may gain electrons. This is called reduction because the oxidation state of the compound or element is being reduced. For example, a species of chrome may carry a $6^+$ charge, $Cr^{6+}$ oxidation state. When the species is in an electron rich environment, it may gain electrons. The addition of the electrons to the $6^+$ charge of chromium results in a $3^+$ state, hence the $6^+$ is lowered, or reduced, to a $3^+$ oxidation state.

Just as pH is a measurement of the concentration of protons in solution, the oxidation reduction potential (ORP), electrode potential or redox potential is a measurement of the availability of electrons that play a role in oxidation or reduction. Where electron-donating chemicals are abundant and electrons are readily available, the ORP is low. Where electron acceptors are numerous and powerful, the ORP is high.

Figure 1:
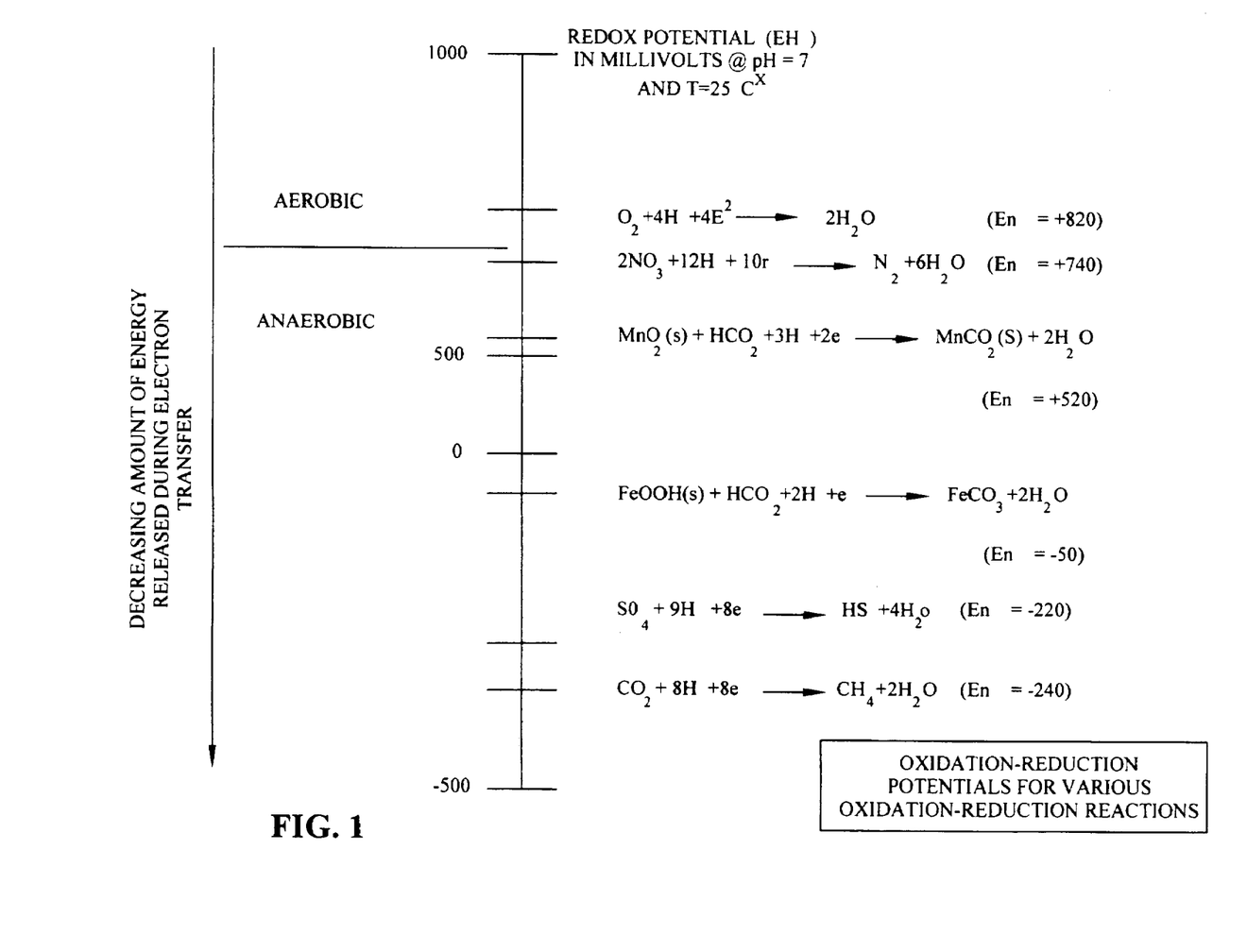
FIG. 1 is oxidation reduction potentials in aerobic and anaerobic conditions.

Because atmospheric oxygen is a strong electron acceptor, its presence raises ORP values. In contrast, sulfur containing compounds and organic chemicals, particularly during decomposition by microorganisms, are usually electron donors and create environments with low ORPs. This close association with oxygen concentrations has led to indirect characterization of the ORP in terms of oxygen availability. "Aerobic" and "anaerobic" conditions are associated with high and low ORP values respectively. FIG. 1 demonstrates this characterization.

Figure 2:
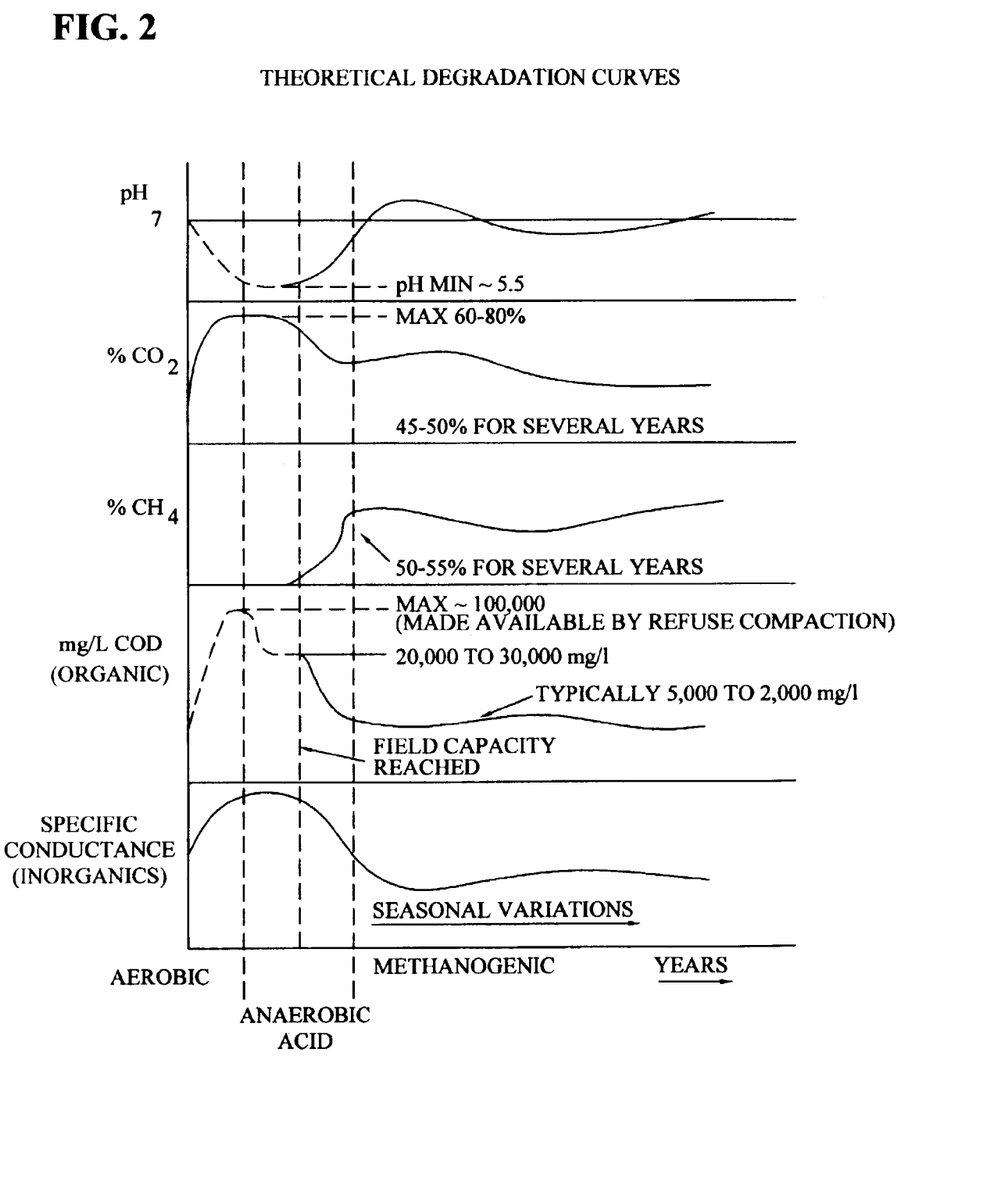
FIG. 2 is a compilation of theoretical landfill degradation curves.

There is a growing substantive body of evidence demonstrating that landfills receiving solid wastes are anaerobic or oxygen depleted as a result of their formation and maturation (U.S. EPA, 1989), (Farquhar, G. J., 1988). There are several typical steps in the maturation of landfills. FIG. 2 is a schematic of the theoretical life cycle for a typical solid waste landfill that shows the relationship between aerobic and anaerobic environments, along with related measurement parameters (Mara, K. and Burlaz, M. A., 1987).

Generation of methane from the degradation of organic materials at landfills is strong evidence that a landfill is anaerobic or oxygen depleted because microorganisms responsible for producing methane from respiration are only capable of surviving under anaerobic conditions. In fact, subtitle D landfills (most municipal solid waste landfills), routinely monitor for methane and have systems in place to effectively manage the methane generated. Moreover, the U.S. EPA has a program in place to encourage the use of methane as an energy source.

The generation of methane, however, is not an exclusive indicator of oxygen depletion or anaerobic conditions. Other reduction reactions, such as the conversion of sulfate to sulfides and nitrates to nitrogen are also indicative of oxygen depleted environments.

The formation of anaerobic environments with low oxidation reduction potential is a function of the availability of oxygen and bacterial activity that consumes oxygen (Brach T. D., 1970). FIG. 1 schematically shows the relationship between anaerobic and aerobic conditions in the environment and ORPs (modified from Bouwer, 1994). Similar to landfills, certain natural environments such as lake sediments, bogs, and marshes are often anaerobic and characteristically exhibit low ORPs.

While land disposal of hazardous waste is not the method of choice from an environmental standpoint—it occupies the lowest position in EPA's hierarchy of methods—it has nonetheless developed an important place in the overall waste and management scheme. This waste management is dictated by complex environmental laws and regulations. The most important of these are contained in the Resource Conservation and Recovery Act ("RCRA"). RCRA dictates when, how and why wastes are disposed. According to RCRA regulations, wastes containing lead, chromium, cadmium, arsenic, mercury, selenium, silver, or barium, must leach no more than minimum concentrations of these metals to be legally defined as non-hazardous. Pursuant to RCRA and 40 C.F.R. part 261, wastes generally are defined as hazardous in two ways. First, wastes are hazardous wastes if they are listed by EPA as hazardous in 40 C.F.R. part 261 subpart D. Second, wastes are also hazardous if they exhibit any of the four characteristics found in 40 C.F.R. part 261 subpart C. These characteristics are ignitability, corrosivity, reactivity, or toxicity based on the Toxicity Characteristic Leaching Procedure ("TCLP").

Pursuant to the EPA, the TCLP test must be used to determine compliance with the leachable metal concentration allowances. The TCLP test is described in 40 C.F.R. § 261, appendix II, which makes reference to SW-846 method 1311. Wastes that fail the TCLP test are hazardous and must be treated and disposed of in permitted RCRA facilities. The disposal of wastes in these facilities is expensive.

This demonstrates the central role the TCLP test plays in waste disposal because it dictates the "hows", "whys" and "wheres" mandated by RCRA. It follows that, to dispose of waste efficiently and inexpensively, the waste must be non-hazardous; to be considered non-hazardous the waste must pass the TCLP test; only then can the waste be taken off the hazardous list, or delisted.

With this understanding of the important environmental characteristics of landfills, the wastes contained therein and the regulations that govern their use as a backdrop, many have attempted to treat or stabilize waste prior to landfilling in order to prevent leaching. The processes and techniques of stabilization/solidification (S/S) have matured into an accepted, important part of environmental technology. As a result, a great many S/S methods have been promoted recently and offered for the treatment of hazardous and other wastes from industry, municipalities, and government sources.

The waste management field has long felt the need for processes that remove and retard metal leachability to render hazardous waste non-leachable. Typically encapsulation processes are employed to reduce the chemical mobility of wastes, whereby various encapsulants are added to the wastes (i.e., liquids and semi-solids) to turn the waste into a solid. Examples of such encapsulants are cement, sodium silicate, asphalt, glass, and various polymers and chemicals. For example, U.S. Pat. No. 5,916,123 to Alexander discloses a process for vitrifying waste into a stabilized form. This process basically solidifies the waste with silicon oxides or incorporates the waste into glass. *A Critical Review of Stabilization/Solidification Technology,* by Conner and Hoeffner, discloses the accepted practice of incorporating metal bearing hazardous materials into cement.

Unfortunately, encapsulation processes have not completely resolved the problem of leachability. Moreover, cement and glass bound wastes are porous, which allows water to penetrate the encapsulated waste. Water, of course, is prone to alternately expand and contract during freeze-thaw cycles. If the treated waste is exposed to freezing temperatures, this expansion and contraction may cause the solidified waste to crumble and expose even more surface area to water, which can further leach the wastes into the environment. Further, these solidification processes tend to be expensive and often greatly increase the amount of material for disposal.

Other traditional heavy metal bearing waste treatments use lime or NaOH to precipitate the metals as hydroxides. For example, U.S. Pat. No. 4,671,882 to Douglas discloses a treatment of metal bearing waste at high pH. U.S. Pat. No. 5,916,123 to Pal discloses the use of lime, or gypsum to treat metal bearing waste. These treatments are based upon the theory that converting hazardous metals to hydroxide form, causes the waste to precipitate and become less soluble in the water leachant. To a large extent this is true. However producing metal hydroxides from mixed metal waste does not ensure the waste is non-leachable. Each metal has an optimum pH range in which the metal hydroxide is non-leachable, some metals at higher pH and others at lower pH, making it difficult for all metal hydroxides to be equally non-leachable at a specified pH.

Sulfide has also been utilized to treat primarily aqueous wastes. (Environmental Protection Agency Summary Report on the Control and Treatment Technology for the Metal Finishing Industry—Sulfide Precipitation, April 1980). However, the use of sulfide alone to precipitate metals in aqueous wastes is problematic because the amount of sulfide cannot be determined accurately, and typically the use of sulfide to precipitate requires excess amounts.

Therefore a need still remains for processes for treating wastes containing hazardous materials that result in the production of non-leachable materials that can be safely and economically disposed of in a landfill.

Additionally, a need remains for waste analysis methods that accurately simulate the practical conditions of landfills so that the leachability of wastes slated for landfill can be correctly predicted. Such accurate methods would protect the environment and promote business that uses environmentally sound methods.

SUMMARY OF THE INVENTION

In accordance with the invention, a method for stabilizing metal-bearing waste is provided by adding a pH adjusting substance to the waste to achieve a leachate with a pH of from about 8.5 to about 12.5, and adding sufficient sulfide containing reducing agent to the waste to reduce the oxidation reduction potential of the waste leachate to less than about 50 mV.

In another aspect, a stabilized metal bearing waste product is provided comprising the reaction product of metal-bearing waste, a pH adjusting substance, and a sulfide containing reducing agent. In one embodiment, the product contains a sulfide containing reducing agent in the amount from about 0.1% by weight to about 2.0% by weight of the total weight of the mixture.

Still another aspect of the present invention provides a method for simulating the leaching of metal bearing waste comprising anaerobically preparing and exposing the waste to an extraction fluid, and separating the extraction fluid from the waste to form a leachate.

Methods are also provided for stabilizing metal bearing waste and anaerobically testing waste for stabilization.

One object of the invention is to provide a method for stabilizing metal-bearing wastes for disposal or containment. Another object of the invention is to provide a method for accurately determining if waste is sufficiently treated and resistant to leaching.

Other objects and further benefits of the present invention will become apparent to persons having ordinary skill in the art from the following written description and accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention is based on the discovery that the combination of reducing the ORP and adjusting the pH of metal bearing waste leachate stabilizes the waste, thereby reliably permitting it to be disposed of efficiently, inexpensively, and safely. Additionally, this invention exploits the discovery that landfills are anaerobic, reducing environments and in light of said discovery, provides a testing method that accurately detects whether leaching will occur in these environments. The invention thus corrects some of the limitations of the current TCLP test.

In accordance with one embodiment of this invention, a method for stabilizing metal bearing waste is provided. The method includes adjusting the pH of the waste to achieve an extract with a pH of from about 8.5 to about 12.5, with a pH adjusting substance and adding a sufficient amount of a sulfide containing reducing agent to reach an ORP of less than 50 mV in the extract.

This invention contemplates stabilizing metal-bearing wastes. For example, metal plating waste, waste acids, waste caustics, contaminated soils, electric arc furnace dust, air pollution control baghouse dust, and petroleum refinery sludges. All these wastes have the common factor of metals that typically are oxidized to a positive oxidation state. This invention is also suitable for any waste with metals in a positive oxidation state or those wastes that are categorized as hazardous or contain hazardous metals.

According to the invention, the pH of the waste is adjusted to achieve an extract with a pH within a range from about 8.5 to about 12.5. To perform this adjustment the invention contemplates the use of an acid or a base. For example, if the waste is a metal plating waste, an extract thereof may in fact have a low pH, wherein the pH will need to be adjusted with a base raising the pH of the extract of the waste to achieve a desired range of pH from about 8.5 to about 12.5. The invention contemplates any suitable base that can be used to adjust the pH of the extract to the desired level. In a particular embodiment the bases are sodium hydroxide (NaOH), calcium oxide (CaO), or calcium hydroxide ($Ca(OH)_2$). The base selected will be obvious to those having ordinary skill in the art.

On the other hand, if the extract of the waste has a pH above 12.5, a pH reducing agent containing sulfide such as an acid is employed. The invention contemplates any suitable acid that would lower the pH of the extract to the range from about 8.5 to about 12.5. In a particular embodiment the acids are hydrochloric acid (HCl), sulfuric acid ($H_2SO_4$) or phosphoric acid ($H_3PO_4$). Compounds and methods suitable for lowering the pH will be obvious to those having ordinary skill in the art.

The present invention further contemplates any suitable reducing agent containing sulfide that enables the stabilized waste extract to reach an oxidation potential less than about 50 millivolts. Again, it is accepted in the art that this measurement be performed on waste extract or leachate. Preferably, the reducing agent employed is a sulfide containing compound. In theory, the reducing agent of this invention donates electrons to the metals in their oxidized state, thereby reducing their oxidized state to a state that prohibits them from being leached by solutions. Generally, reducing agents are those elements, compounds or solutions that, when represented in terms of a Pourbaix diagram, have low upper boundaries. In a particular embodiment the reducing agents are sodium hydrosulfide (NaSH), calcium polysulfide or ferrous sulfide. In another embodiment, the sulfide containing reducing agent is added from about 0.1% by weight to about 2.0% by weight of the total weight of the mixture. The invention contemplates that a lower amount of sulfide containing reducing agent may be used. However, lower amounts may prove ineffective. Of course, higher amounts may be used to ensure reduction of the metals to be stabilized.

As will be shown by example, the sulfur compounds used are not leached or extracted from the stabilized waste in appreciable quantities. Therefore, another advantage of this invention is that the chemicals added while using this invention do not contribute to the problem of leachate contamination.

By increasing the pH, in theory, the metals are being precipitated into solid form, thereby making mobilization into the leachate more difficult. In that same vein, it has been shown that sulfide compounds at high pH may in fact precipitate metals. This invention contemplates the use of sulfide compounds not only as a precipitating agent, but also to reduce the oxidation state of normally leachable or extractable materials in the waste.

Waste can be stabilized according to this invention using accepted industrial processes, which include in situ (in, or at, the site) or ex situ (away from the site) processes. The ex situ processes are derived from the fact that waste is excavated from its previous location and processed through a treatment system before being redeposited in the excavation or landfilled in another location. Ex situ methods and systems typically require an assembly of mixers, chemical storage and feeding devices, pumps, conveyors and ancillary equipment, the choice of which is determined by the actual treatment and disposal scenario. Any of these ex situ methods can incorporate this invention.

Figure 3:
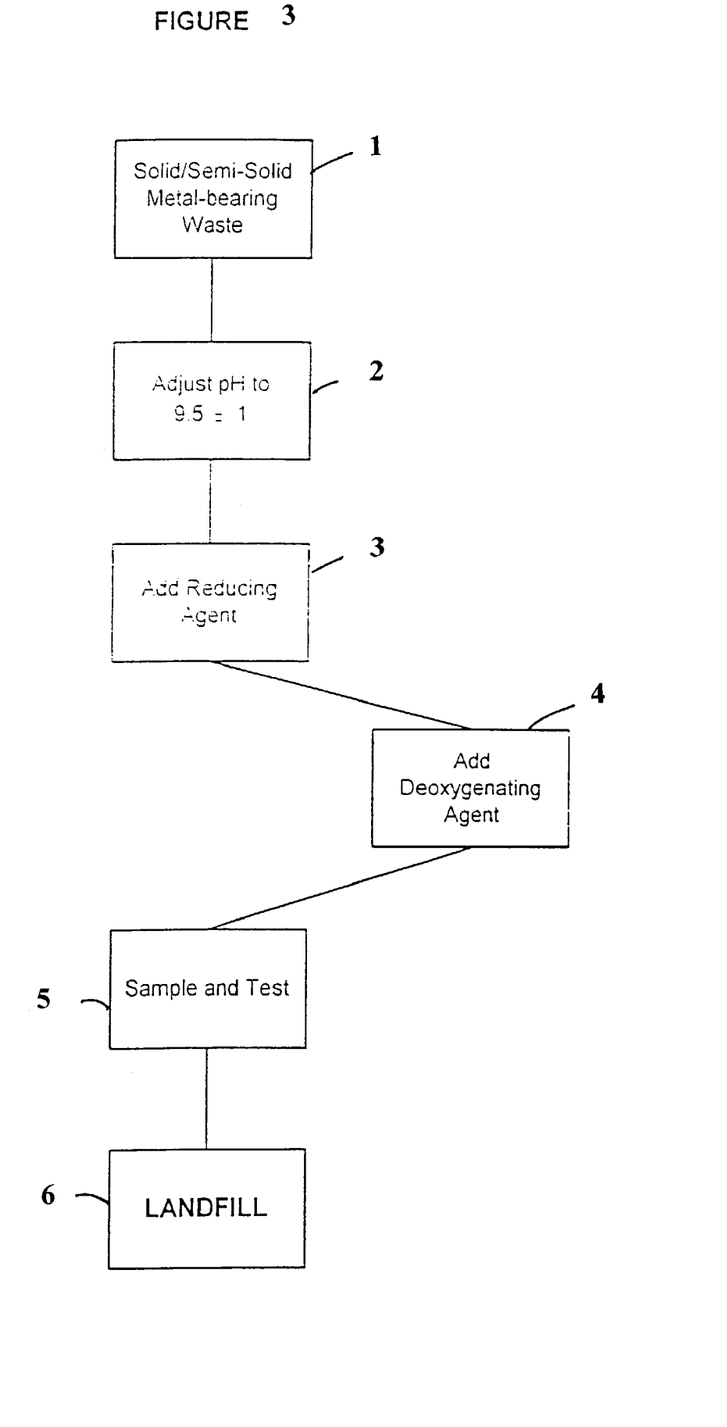
FIG. 3 is a flow chart of one embodiment of stabilization and testing procedures according to the present invention.

FIG. 3 is a flow chart of one embodiment of stabilization and testing procedures according to the present invention which is applicable to an ex situ method. In FIG. 3 a metal bearing waste from step 1 is pH adjusted in step 2 to achieve an extract pH of from about 8.5 to about 12.5 (9.5±1 shown as an example). In step 3, a sulfide containing reducing agent is added to the pH adjusted metal bearing waste. Next, an optional step 4 of adding a deoxygenating agent can be provided. In step 5 the metal bearing waste is sampled and tested to determine ORP of the leachate (and confirm pH). Once the sampling and testing confirm stabilization according to the present invention, the stabilized metal bearing waste is deposited in a landfill in step 6.

In situ, stabilization is generally limited to remedial situations where the stabilizing components are introduced into the contaminated medium, usually sludge or soil by using large scale excavation, tilling, or drilling equipment designed originally for respective traditional purposes, but modified for stabilization chemical addition. The in situ methods include back-hoe methods, drilling, trenching methods, liquid injection methods, area or shallow methods. Like the ex situ methods, any of these in situ methods may incorporate this invention.

In another embodiment, the present invention provides a stabilized metal bearing waste product suitable for landfilling. The stabilized metal bearing waste includes the reaction product of the metal bearing waste, a pH adjusting substance, and a sulfide containing reducing agent. The pH adjusting substance is present in an amount necessary to bring the pH of an extract of the waste to from about 8.5 to about 12.5. The sulfide containing reducing agent is present in an amount and is a type capable of adjusting the oxidation reduction potential of the waste extract to less than about 50 millivolts.

Another embodiment of this invention provides a method for simulating the leachability of metal bearing waste under the true anaerobic reducing environment of landfills. This embodiment comes from the realization that the current TCLP test, required by current environmental regulations, falls short of accurately simulating the waste material leachability because the test takes place in an oxidizing environment.

Fundamentally, the TCLP test is in place to simulate, and allow for testing, what may happen in the landfill when waste is exposed to ground water either through rain, percolation, or underground water movement. To closely simulate the complex environmental relationships present in a landfill, the TCLP is summarily performed as follows: an amount of waste to be tested, typically 100 grams is combined with an amount of extraction fluid dictated by the method and dependant on the alkalinity of the waste to be tested. This extraction fluid includes deionized water that has either an acidic, neutral or alkaline pH depending on the testing procedures used. The extraction fluid and the waste to be treated are then mixed by rotation or agitation for about 18 hours in a sealed container, without regard to the amount of air void volume in the mixing container. Therefore, ambient air is mixed with the sample and the extraction fluid.

After mixing, the fluid and solids are separated by filtration methods leaving the solid and what is referred to as the TCLP extract. Under this procedure this TCLP extract is intended to simulate what would be the leachate if, in fact, the waste were landfilled. The pH of the TCLP extract is then measured and depending on the analysis of the extract to be performed the extract may or may not be treated with nitric acid as a preservative. The TCLP extract is then analyzed by various means depending on the character of the waste.

While the TCLP test is meant to simulate an actual landfill, because of the high amount of oxygen introduced with ambient air, it actually does not. As discussed above, landfills have an anaerobic or reducing environment. This invention exploits the discovery that a reducing environment has a profound impact on the solubility of constituents in metal bearing waste.

The TCLP test, because of the oxygen introduced with ambient air, actually simulates an oxidizing environment that increases the leachability of metals. As such, this negatively charged compound or element that would, in a practical landfill, leach, will not be detected in the TCLP extract. It follows that, a material that passes the standard TCLP test may in fact leach hazardous materials into the environment when placed in a working landfill.

Alternatively, it may be shown that the TCLP test, when used to determine if landfilled waste will leach into the environment, in practice restricts wastes from being landfilled that would not, in fact, leach. As has been shown, the solubility of a compound or element is dependant on the oxidation state of the compound or element. Landfills have reducing environments in which compounds or elements gain electrons. Therefore, a compound or element at a low oxidation state may become oxidized during TCLP. Once oxidized, the compound or element may be more soluble in the TCLP extraction fluid and will erroneously appear in the TCLP extract. This appearance may cause the waste analyzed to fail the TCLP test for limits on a particular metal.

One method of the present invention includes the preparation of an extraction fluid, mixing or exposing the metal bearing waste to the extracting fluid under anaerobic conditions in an extraction vessel to form a mix, filtering the mix under anaerobic conditions to remove the waste and form a leachate, and measuring the oxidation reduction potential of the extract.

The present invention contemplates any suitable method for preparing the extraction fluid used to simulate leachant. As demonstrated, landfill leachate has a dissolved oxygen content less than 1.0 mg/L but, the dissolved oxygen content of deionized water used in the standard TCLP test is about 6.0 mg/L. In a particular embodiment of the present invention, the extraction fluid is deoxygenated with a deoxygenating agent. The invention contemplates any suitable deoxygenating agent. In a particular embodiment the deoxygenating agent is sodium hydrosulfite. Persons having ordinary skill in the art will be able to select a deoxygenating agent that, when added to a solution or material, inhibits the oxidizing effect of oxygen.

In another embodiment the extraction fluid is prepared by purging the fluid with a deoxygenating gas. The invention contemplates any suitable gas possessing characteristics allowing for efficient purging of oxygen. In a particular embodiments the deoxygenating gas is nitrogen, neon, helium or argon.

The present invention contemplates any suitable method for exposing the metal bearing waste to the extraction fluid under anaerobic conditions to form a mix in an extraction vessel that provides for the limitation of the headspace in the extraction vessel. The headspace is the volume between the top or cap of the extraction vessel and the extracting fluid or waste itself. In a standard TCLP scenario, the headspace is significant and contains a large volume of air which, upon extraction, mixes oxygen into the extraction fluid and the waste. By providing for limited to zero headspace, the method of this invention limits or removes oxygen that may oxidize the waste. The invention contemplates any extraction vessel that may be sealed sufficiently to prevent oxygen contamination.

In another embodiment of the present invention, the leachate is separated from the metal bearing waste under anaerobic conditions. This method contemplates any suitable method for performing this separation in an anaerobic fashion. In a particular embodiment, separation is performed in an oxygen limited or free environment. This particular embodiment contemplates the separation of the leachate from the metal bearing waste in a nitrogen atmosphere, but any safe low to zero level oxygen gas may be used.

The present invention further includes the determination of the oxidation reduction potential (ORP) of the extract. The use of any reliable oxidation reduction potential measuring device for the determination of the ORP is contemplated. One of ordinary skill can easily select an appropriate device, and such devices are readily available. As demonstrated the ORP is a direct indicator of the oxidation states of the hazardous metals and the environment of the extract. Recall that the oxidation states are an indication of solubility and the environment of the extract is an indication of anaerobic (reducing) or aerobic (oxidizing) conditions, wherein the determination of both the pH and the ORP conditions are a more accurate indication of the practical leachability of the metal bearing waste.

In a final embodiment of the present invention, a complete method for stabilizing metal bearing waste and simulating the stabilized waste leaching characteristics is provided. In one aspect this complete method combines the methods described above for stabilizing metal bearing wastes and the method for simulating the leaching of metal bearing waste.

The present invention shall be more correctly explained with the following examples, which are to be considered merely representative of the present invention and thus should not be considered as limiting:

EXAMPLES

Example 1

Study of ORP Environment of Two Industrial Landfills Containing Treated Residues From Industrial Waste Materials and Methods 1. Two landfills constructed with synthetic liners had contained waste materials. During containment, the waste was covered nearly immediately upon filling with native soil. Once a cell, a section of an entire landfill, reached capacity, which is typically after many tens of feet of waste material has been placed in a cell, the cell was closed. The waste of the cells were considered inorganic, however, small quantities of organic components were present, and these components served as energy sources for bacterial growth, thus creating a reducing environment. The origin of the organic material was attributable to detergents, surfactants, wetting compounds, oily solids from used oil processing operations, and non-hazardous waste waters with an organic component. In addition, straw, plastic, personal protective equipment, and other materials with carbon content were also present. The specific character of each landfill was as follows:

Landfill A. This was a subtitle C landfill and its closure consisted of the placement of a flexible membrane liner, followed by a constructed clay cap, followed by a grass cover material. This cell had been open for approximately five years at the time of sampling.

Landfill B. This was a subtitle D landfill and its closure consisted of a constructed clay cap, followed by cover materials to prevent erosion and exposure of the waste materials. This cell had been open for about two years at the time of sampling.

2. Samples of leachate were collected from active Landfill A and the active cell from the Landfill B. In order to collect samples of the leachate from the landfills, the pumps at the base of the landfill cells were allowed to fill with leachate in order to minimize the amount of head space and oxygen contamination as well as limit contact with air within the pumps, these mitigating the impact of pump impellers agitating leachate. While the leachate sumps and sampling procedure were not perfectly sealed from the presence of atmospheric oxygen, the purpose of the procedure was to minimize leachate contact with atmospheric oxygen during the sampling event. The sampling was performed by installing 2" diameter PVC monitoring well casing into the sump, placing polypropylene tubing through the well casing as deeply as possible into the sump (since shallow leachate could be exposed to oxygen as the leachate sump is open to the atmosphere), and drawing the leachate into the service using a peristaltic pump and polypropylene tubing. A small amount of leachate was pumped from the tubing to remove air bubbles. The pump was then turned off and the pump tubing was pulled out of the casing to the surface. The down hole end of the tubing was placed in the instrument sample cup, the pump was reversed, and the leachate in the tubing was pumped slowly into a hydrolab (measuring instrument) sampling cup from bottom up. The measuring instruments sample cup was then screwed onto the measurement instrument.

3. The pH, oxidation reduction potential, and dissolved oxygen concentration were then measured utilizing standard techniques. Table 1 provides the results of the field testing associated with the leachate sample collection.

TABLE 1

Landfill Leachate Field Measurements

| | | | Parameters Measured | | |
|---|---|---|---|---|---|
| Landfill | Type | Opened | pH | Dissolved Oxygen (mg/L) | ORP (mV) |
| A | Subtitle C | October 1995 | 7.05 | 0.78 | 9 |
| B | Subtitle D | December 1998 | 6.8 | 1.17 | 197 |

Conclusion

Based on these leachate values, it is apparent that the dissolved oxygen concentrations are similar to the dissolved oxygen concentrations used in anaerobically prepared synthetic leachants. These synthetic leachants correspond to the extraction fluids prepared during waste stabilization testing. Of note to be discussed later is the dissolved oxygen content of the field samples were field measured at 0.78 mg/L in Landfill A, opened in 1995, and 1.17 mg/L in Landfill B, opened in 1998, as well as the oxidation reduction potentials of the Landfill A and B leachate, which respectively were 9 and 197 millivolts.

This demonstrates the accuracy of the representations of FIGS. 1 and 2. The leachate of Landfill A has a low dissolved oxygen content and an ORP less than 50 mV. This data demonstrates that the leachate was produced from a landfill that has a reducing or anaerobic environment. Moreover, while not fully anaerobic, the lower than ambient dissolved oxygen and ORP levels of the leachate from Landfill B demonstrate it is maturing into a landfill with anaerobic characteristics similar to those of Landfill A. This experiment shows that landfills have a reducing or anaerobic environment.

Example 2

Stability of Treated EAF Dust Tested by Standard TCLP

Materials and Methods
 1. Treatment of Waste
  A. The pH of 100 grams of EAF Dust was adjusted to achieve an extract pH of 11.5 using lime.
  B. Sufficient sodium hydrosulfide (NaSH) was then added to achieve a 1% (wt./wt.) mixture.
 2. Stability Determination of Waste
  A. The treated waste was then extracted under neutral and alkaline conditions according to EPA method 1311 of SW 846.
  B. The treated waste extracted in step 2A above was extracted three additional times, once each day from the first day of extraction.
  C. The specific metal content, oxidation reduction potential, sulfide content and pH of each leachate extracted was then determined. This data is represented in Table 2.

TABLE 2

Leachate characteristics of stabilized waste under standard extract conditions

| | First Extraction | Second Extraction | Third Extraction | Fourth Extraction |
|---|---|---|---|---|
| Neutral Leachate (pH 6) | | | | |
| pH | 11.3 | 11.7 | 11.5 | 11.3 |
| ORP (mV) | −388 | −30 | −30 | −35 |
| Sulfide (mg/L) | <13 | <13 | <13 | <13 |
| Cd (mg/L) | <0.025 | <0.025 | <0.025 | <0.025 |
| Cr (mg/L) | <0.050 | 0.36 | 0.34 | 0.4 |
| Pb (mg/L) | <0.25 | 0.64 | <0.25 | <0.25 |
| Zn (mg/L) | 2 | 0.46 | 0.39 | 0.41 |
| Alkaline Leachate (pH 12) | | | | |
| pH | 11.7 | 12.4 | 12.5 | 12.2 |
| ORP (mV) | −395 | −80 | −93 | −131 |
| Sulfide (mg/L) | <13 | <13 | <13 | <13 |
| Cd (mg/L) | <0.025 | <0.025 | <0.025 | <0.025 |
| Cr (mg/L) | <0.050 | 0.15 | 0.19 | 0.11 |
| Pb (mg/L) | <0.25 | 34 | 14 | 6.2 |
| Zn (mg/L) | 2.8 | 2.6 | 2.5 | 2.6 |

Conclusion

Table 2 shows the increase in ORP values between the first and second extraction, which is consistent with the treated wastes exposure to an oxidizing agent during the standard TCLP analysis. Consistent with the ORP increase, which demonstrates the exposure to an oxidizing agent, is the increase in lead and chromium concentrations under neutral and alkaline conditions between the first and second extraction. These metal increases demonstrate the loss of a reducing environment due to the presence of an oxidizing agent. With the demonstration of the reducing environment of landfills shown in Example 1 in mind, this experiment demonstrates the failure of the standard TCLP test to simulate actual landfill conditions due to the contamination and subsequent creation of an oxidizing environment due to multiple extractions.

Example 3

Stability of Treated EAF Dust Tested by Modified TCLP in Accordance with Present Invention Materials and Methods
 1. Treatment of Waste
  A. The pH of 100 grams of EAF Dust was adjusted to achieve an extract pH of 11.5 using lime.
  B. Sufficient NaSH was then added to achieve a 1% (wt./wt.) mixture.
 2. Stability Determination of Waste
  A. The treated waste was then extracted under neutral and alkaline conditions according to EPA method 1311 of SW 846 modified according to this invention. Particularly, exposure of the waste material to the extracting fluid was preferred in a zero headspace extractor (ZHE). Further modifying 1311, separation of the extraction fluid from the waste material to form an extract was conducted under a nitrogen atmosphere.
  B. The same treated waste extracted in step 2A above was extracted three additional times according to the described method, once each day from the first day of extraction.
  C. The specific metal content, oxidation reduction potential and pH of each leachate extracted was then determined. This data is represented in Table 3.

TABLE 3

Stabilized EAF dust leachate characteristics extracted under modified TCLP

|  | First Extraction | Second Extraction | Third Extraction | Fourth Extraction |
|---|---|---|---|---|
| Neutral Leachate (pH 6) | | | | |
| pH | 12.0 | 12.0 | 11.6 | 11.2 |
| ORP (mV) | −309 | −109 | −33 | 20 |
| Cd (mg/L) | <0.025 | <0.025 | <0.025 | <0.025 |
| Cr (mg/L) | <0.050 | <0.050 | 0.12 | 0.17 |
| Pb (mg/L) | <0.25 | <0.25 | <0.25 | <0.25 |
| Zn (mg/L) | 1.6 | 0.52 | 0.41 | 0.32 |
| Alkaline Leachate (pH 12) | | | | |
| pH | 12.2 | 12.5 | 12.4 | 12.3 |
| ORP (mV) | −335 | −186 | −135 | −78 |
| Cd (mg/L) | <0.025 | <0.025 | <0.025 | <0.025 |
| Cr (mg/L) | <0.050 | <0.050 | <0.050 | <0.050 |
| Pb (mg/L) | <0.25 | <0.25 | <0.25 | 8.7 |
| Zn (mg/L) | 3.2 | 2.8 | 2.5 | 2.4 |

Conclusion

This experiment demonstrates the important role oxygen contamination plays during the extraction process. By limiting the amount of oxygen the extract and treated waste are exposed to during the extraction procedures, the ORP levels increase as drastically after the first extraction. The ORP of the extract is more consistent with those levels demonstrated in the actual landfills of Example 1. Therefore, by limiting the oxygen contamination during extraction the analysis more closely simulates the environment of an actual landfill.

Of most significant importance is the consistent lack of metal extracted. Here, in almost all cases, the amount of metals found in the leachate is below detection limits. Therefore, an extraction method that simulates the anaerobic environment of landfills will provide more accurate results.

Example 4

Stability of Treated EAF Dust Tested by Comprehensive Modified TCLP

Materials and Methods

1. Treatment of Waste

A. The pH of 100 grams of EAF Dust was adjusted to achieve an extract pH of 11.5 using lime.

B. Sufficient NaSH was then added to achieve a 1% (wt./wt.) mixture.

2. Stability Determination of Waste

A. The treated waste was then extracted under neutral and alkaline conditions according to EPA method 1311 of SW 846 modified according to this invention. Particularly, prior to exposing the treated waste material to the extracting fluid, sufficient sodium hydrosulfite was added to the extracting fluid to obtain a dissolved oxygen concentration of less than 0.5 mg/L. Exposure of the treated waste material to the extracting fluid was performed in a ZHE. Further modifying 1311, separation of the extraction fluid from the waste material to form an extract was conducted under nitrogen.

B. The same treated waste extracted in step 2A above was extracted nine additional times according to the modified method, once each day from the first day of extraction to, in one aspect, simulate landfill exposure to a constant stream of water.

C. The specific metal content, oxidation reduction potential, dissolved oxygen content and pH of each leachate extracted was then determined. This data is represented in Table 4.

TABLE 4

Comprehensive Leachate characteristics of stabilized EAF dust

| | First Extraction | Second Extraction | Third Extraction | Fourth Extraction | Fifth Extraction | Sixth Extraction | Seventh Extraction | Eighth Extraction | Ninth Extraction | Tenth Extraction |
|---|---|---|---|---|---|---|---|---|---|---|
| Neutral Leachate (pH 6) | | | | | | | | | | |
| pH | 11.6 | 11.4 | 11.0 | 12.5 | 11.1 | 10.8 | 10.7 | 10.7 | 10.6 | 10.4 |
| ORP (mV) | −300 | −35 | −50 | −35 | 55 | 20 | 64 | 65 | 40 | 30 |
| DO | 0.2 | 0.2 | 0.2 | 0.2 | 0.3 | 0.2 | 0.2 | 0.2 | 0.1 | 0.2 |
| Sb (mg/L) | <0.005 | <0.005 | 0.0079 | <0.005 | 0.0074 | <0.005 | <0.005 | <0.005 | <0.005 | <0.005 |
| As (mg/L) | <0.005 | <0.005 | <0.005 | <0.005 | <0.005 | <0.005 | <0.005 | <0.005 | <0.005 | <0.005 |
| Ba (mg/L) | 0.27 | 0.06 | 0.048 | <0.050 | 0.03 | 0.024 | 0.022 | 0.02 | 0.018 | 0.016 |
| Be (mg/L) | <0.001 | <0.001 | <0.001 | <0.004 | <0.001 | <0.001 | <0.001 | <0.001 | <0.001 | <0.001 |
| Cd (mg/L) | <0.001 | <0.001 | <0.001 | <0.004 | <0.001 | <0.001 | <0.001 | <0.001 | <0.001 | <0.001 |
| Cr (mg/L) | <0.050 | <0.02 | <0.02 | <0.40 | <0.01 | 0.014 | <0.01 | <0.01 | <0.01 | 0.011 |
| Pb (mg/L) | <0.005 | 0.029 | 0.015 | <0.005 | <0.005 | <0.005 | <0.005 | <0.005 | <0.005 | <0.005 |
| Ni (mg/L) | <0.050 | <0.03 | <0.03 | <0.20 | <0.03 | <0.03 | <0.03 | <0.03 | <0.03 | <0.03 |
| Se (mg/L) | 0.0086 | <0.005 | <0.005 | <0.005 | <0.025 | 0.006 | <0.005 | <0.005 | <0.005 | <0.005 |

TABLE 4-continued

Comprehensive Leachate characteristics of stabilized EAF dust

| | First Extraction | Second Extraction | Third Extraction | Fourth Extraction | Fifth Extraction | Sixth Extraction | Seventh Extraction | Eighth Extraction | Ninth Extraction | Tenth Extraction |
|---|---|---|---|---|---|---|---|---|---|---|
| Ag (mg/L) | <0.10 | <0.10 | <0.10 | <0.025 | <0.01 | <0.01 | <0.01 | <0.01 | <0.01 | <0.01 |
| Ti (mg/L) | <0.005 | <0.005 | <0.005 | <0.005 | <0.002 | <0.002 | <0.002 | <0.002 | <0.002 | <0.002 |
| V (mg/L) | <0.050 | 0.013 | 0.014 | <0.050 | 0.059 | 0.091 | 0.11 | 0.13 | 0.12 | 0.1 |
| Zn (mg/L) | 2.0 | 0.5 | 0.38 | 0.3 | <0.05 | <0.05 | <0.05 | <0.05 | <0.05 | <0.05 |
| Alkaline Leachate (pH 12) | | | | | | | | | | |
| pH | 12.0 | 12.1 | 12.0 | 12.0 | 12.2 | 12.0 | 12.0 | 12.0 | 12.0 | 12.0 |
| ORP (mV) | −310 | −110 | −85 | −75 | −50 | −55 | −45 | −45 | −30 | −25 |
| DO | 0.2 | 0.2 | 0.2 | 0.1 | 0.2 | 0.2 | 0.1 | 0.2 | 0.2 | 0.2 |
| Sb (mg/L) | <0.005 | <0.005 | <0.005 | <0.005 | <0.005 | <0.005 | <0.005 | <0.005 | <0.005 | <0.005 |
| As (mg/L) | <0.005 | <0.005 | <0.005 | <0.025 | <0.005 | <0.005 | <0.005 | <0.005 | <0.005 | <0.005 |
| Ba (mg/L) | 0.33 | 0.099 | 0.051 | <0.050 | 0.025 | 0.017 | 0.019 | 0.016 | 0.016 | 0.013 |
| Be (mg/L) | <0.001 | <0.001 | <0.001 | <0.001 | <0.001 | <0.001 | <0.001 | <0.001 | <0.001 | <0.001 |
| Cd (mg/L) | <0.001 | <0.001 | <0.001 | <0.001 | <0.001 | <0.001 | <0.001 | <0.001 | <0.001 | <0.001 |
| Cr (mg/L) | <0.050 | <0.02 | <0.02 | <0.04 | <0.01 | <0.01 | <0.01 | <0.01 | <0.01 | <0.01 |
| Pb (mg/L) | <0.005 | 0.031 | 0.021 | <0.025 | 0.022 | 0.089 | 0.041 | 0.19 | 0.13 | 0.57 |
| Ni (mg/L) | <0.050 | <0.03 | <0.03 | <0.20 | <0.03 | <0.03 | <0.03 | <0.03 | <0.03 | <0.03 |
| Se (mg/L) | 0.013 | 0.0086 | 0.0083 | <0.025 | 0.0084 | <0.025 | <0.025 | <0.025 | 0.0064 | <0.025 |
| Ag (mg/L) | 0.062 | <0.01 | <0.01 | <0.025 | <0.01 | <0.01 | <0.01 | <0.01 | <0.01 | <0.01 |
| Ti (mg/L) | <0.005 | <0.005 | <0.005 | <0.005 | <0.002 | <0.002 | <0.002 | <0.002 | <0.002 | <0.002 |
| V (mg/L) | <0.050 | <0.01 | <0.01 | <0.050 | <0.01 | <0.01 | <0.01 | <0.01 | <0.01 | <0.01 |
| Zn (mg/L) | 4 | 2.7 | 2.6 | 2.7 | 2.4 | 2.4 | 2.4 | 2.5 | 2.4 | 2.4 |

Conclusion

This comprehensive characterization of the leachate further demonstrates the role of oxygen contamination during the extraction procedure as well as the insignificant role of other metals that may be present in the waste material. In almost all cases, the removal of oxygen during the extraction process limited the amount of metals present in the leachate to below detection limits. This validates the superior stabilizing ability of this invention when the treated waste is tested under conditions that accurately simulate the conditions of an actual landfill. This example also demonstrates the ability of this invention to stabilize even less toxic metals.

Example 5

Stability of Treated (2.5% NaSH) EAF Dust Tested by Modified TCLP

Materials and Methods
1. Treatment of Waste
  A. The pH of 100 grams of EAF Dust was adjusted to achieve an extract pH of 11.5 using lime.
  B. Sufficient NaSH was then added to achieve a 2.5% (wt./wt.) mixture.

2. Stability Determination of Waste
  A. The treated waste was then extracted under alkaline conditions according to EPA method 1311 of SW 846 modified according to this invention. Particularly, prior to exposing the treated waste material to the extracting fluid, sufficient sodium hydrosulfite was added to the extracting fluid to obtain a dissolved oxygen concentration of less than 0.5 mg/L. Exposure of the treated waste material to the extracting fluid was performed in a ZHE. Further modifying 1311, separation of the extraction fluid from the waste material to form an extract was conducted under nitrogen.
  B. The same treated waste extracted in step 2A above was extracted seven additional times, once each day from the first day of extraction.
  C. The specific metal content, oxidation reduction potential, and pH of each leachate extracted was then determined. This data is represented in Table 5.

TABLE 5

Leachate characteristics of stabilized EAF dust
Alkaline Leachate (pH 12)

|  | First Extraction | Second Extraction | Third Extraction | Fourth Extraction | Fifth Extraction | Sixth Extraction | Seventh Extraction | Eighth Extraction |
|---|---|---|---|---|---|---|---|---|
| pH | 12.3 | 12.3 | 12.2 | 11.9 | 11.5 | 11.6 | 11.6 | 11.7 |
| ORP (mV) | −360 | −230 | −115 | −94 | −120 | −120 | −52 | −27 |
| Cd (mg/L) | <0.025 | <0.025 | <0.025 | <0.025 | <0.025 | <0.025 | <0.025 | <0.025 |
| Cr (mg/L) | <0.050 | <0.050 | <0.050 | <0.050 | <0.050 | <0.050 | <0.050 | <0.050 |
| Pb (mg/L) | <0.25 | <0.25 | <0.25 | <0.25 | <0.25 | <0.25 | <0.25 | 0.36 |
| Zn (mg/L) | 3.6 | 2.7 | 2.3 | 2.6 | 2.5 | 3.0 | 2.5 | 2.6 |

Conclusion

These results demonstrate the affect of the additional reducing agent and the limiting of oxygen contamination during extraction. The ORP increases slightly after the first extraction but thereafter remains relatively constant and twice as low as extractions performed without limiting oxygen contamination, as demonstrated in previous examples. Again, in almost all cases the amount of toxic metals are below detection limit which demonstrates the superior waste stabilizing ability of this invention.

Example 6

Stability of Treated and Partially Treated Cupola Dust Tested by Modified and Standard TCLP Materials and Methods 1. Treatment of Waste A. For Sample 1A, the pH of 100 grams of Cupola Dust was adjusted to achieve an extract pH of 11.5 by adding lime to make a final mixture of 9% (wt./wt.).

B. For Sample 1B, the pH of 100 grams of Cupola Dust was adjusted to achieve an extract pH of 11.5 by adding lime to make a final mixture of 9% (wt./wt.). This sample was further treated with sufficient NaSH to achieve a 1.0% (wt./wt.) mixture.

2. Stability Determination of Waste

A. Sample 1A was then extracted under neutral and acidic conditions according to standard EPA method 1311 of SW 846 and ii) standard EPA method 1311 of SW 846 modified according to this invention. Particularly, prior to exposing the treated waste material to the extracting fluid, sufficient sodium hydrosulfite was added to the extracting fluid to obtain a dissolved oxygen concentration of less than 0.5 mg/L. Exposure of the treated waste material to the extracting fluid was performed in a ZHE. Further modifying 1311, separation of the extraction fluid from the waste material to form an extract was conducted under nitrogen.

B. Sample 1B above was then extracted under neutral and acidic conditions according to i) standard EPA method 1311 of SW 846 and ii) standard EPA method 1311 of SW 846 modified according to this invention. Particularly, prior to exposing the treated waste material to the extracting fluid, sufficient sodium hydrosulfite was added to the extracting fluid to obtain a dissolved oxygen concentration of less than 0.5 mg/L. Exposure of the treated waste material to the extracting fluid was performed in a ZHE. Further modifying 1311, separation of the extraction fluid from the waste material to form an extract was conducted under nitrogen.

C. The specific metal content, oxidation reduction potential, and pH of each leachate extracted was then determined. This data is represented in Table 6.

TABLE 6

Leachate characteristics of stabilized cupola dust

| Stabilization | Extraction | pH | ORP | Cd (mg/L) | Cr (mg/L) | Pb (mg/L) | Zn (mg/L) | Ni (mg/L) |
|---|---|---|---|---|---|---|---|---|
| Sample 1A 9% (wt/wt)Lime | pH = 2.88, aerobic | 11.6 | −152 | 0.028 | 0.022 | 7.6 | 6.8 | 0.095 |
|  | pH = 6.5, aerobic | 12.31 | −198 | 0.027 | 0.017 | 27 | 11 | 0.049 |
|  | pH = 2.88, anaerobic | 10.67 | −266 | 0.019 | 0.029 | 0.26 | 0.1 | 0.1 |
|  | pH = 6.5, anaerobic | 12.33 | −221 | 0.022 | 0.02 | 6.9 | 10 | 0.067 |
| Sample 1B 9% (wt/wt)Lime and 1% (wt/wt) NaSH | pH = 2.88, aerobic | 11.84 | −562 | 0.035 | 0.009 | 0.2 | 0.015 | 0.39 |
|  | pH = 6.5, aerobic | 12.18 | −560 | 0.014 | 0.018 | 0.15 | 0.009 | 0.091 |
|  | pH = 2.88, anaerobic | 11.46 | −606 | 0.02 | 0.016 | 0.3 | 0.008 | 0.75 |
|  | pH = 6.5, anaerobic | 12.3 | −594 | 0.03 | 0.005 | 0.34 | 0.015 | 0.093 |

Conclusion

This example demonstrates the weaknesses of the prior art stabilization techniques, the standard extraction techniques and the ability of this invention to be used on wastes other than EAF dust. With particular attention to Pb, the data shows that simply treating waste with a base will not sufficiently stabilize the waste even when it is tested according to methods that accurately imitate the conditions of an anaerobic landfill. However, when the waste is treated according this invention and it is tested under conditions that more clearly imitate those of real world landfills, the amount of toxic metal found in the leachate drops to an insignificant level. Further, the stabilization method of the present invention can be used to stabilize Cupola dust as well as EAF dust.

B. Sample 1B above was then extracted under acidic conditions according to i) standard EPA method 1311 of SW 846 and ii) standard EPA method 1311 of SW 846 modified according to this invention. Particularly, prior to exposing the treated waste material to the extracting fluid, sufficient sodium hydrosulfite was added to the extracting fluid to obtain a dissolved oxygen concentration of less than 0.5 mg/L. Exposure of the treated waste material to the extracting fluid was performed in a ZHE. Further modifying 1311, separation of the extraction fluid from the waste material to form an extract was conducted under nitrogen.

C. The specific metal content, oxidation reduction potential, and pH of each leachate extracted was then determined. This data is represented in Table 7.

TABLE 7

Leachate characteristics of stabilized and untreated metal plating sludge.

| Stabilization | Extraction | pH | ORP | Cd (mg/L) | Cr (mg/L) | Pb (mg/L) | Zn (mg/L) | Ni (mg/L) |
|---|---|---|---|---|---|---|---|---|
| Metal Plating Sludge | pH = 2.8, aerobic | 6.08 | 246 | 0.22 | 0.31 | 0.24 | 2900 | 87 |
| No Treatment | pH = 2.88, anaerobic | 5.92 | 191 | 0.2 | 0.32 | 0.3 | 2600 | 102 |
| 1% (wt/wt) NaSH | pH = 2.88, aerobic | 6.29 | 32.7 | 0.032 | 0.17 | 0.49 | 1500 | 88 |
|  | pH = 2.88, anaerobic | 6.15 | −73 | 0.033 | 0.16 | 0.46 | 1800 | 80 |
| 7% (wt/wt) lime | pH = 2.88 normal | 7.16 | 14.1 | <0.01 | <0.05 | 0.03 | 42 | 29 |
| 1% (wt/wt) NaSH | pH = 2.88 anaerobic | 8.23 | −17.3 | <0.01 | <0.05 | <0.01 | 0.21 | 0.76 |
| 8% (wt/wt) lime | pH = 2.88 normal | 9.08 | 15.7 | <0.01 | <0.05 | <0.01 | <0.10 | 0.2 |
| 1% (wt/wt) NaSH | pH = 2.88 anaerobic | 10.63 | −5.3 | <0.01 | <0.05 | <0.01 | <0.10 | 0.19 |

Example 7

Stability of Treated and Untreated Metal Plating Sludge Tested by Modified and Standard TCLP Materials and Methods 1. Treatment of Waste A. 100 grams of metal plating sludge was left untreated to serve as a control sample.

B. The pH of another 100 grams of metal plating sludge was adjusted to achieve an extract pH of from 8.5 to 12.5 with lime, this sample was further treated with sufficient NaSH to achieve a 1.0% (wt./wt.) mixture.

2. Stability Determination of Waste

A. Sample 1A was then extracted under neutral and acidic conditions according to standard EPA method 1311 of SW 846 and ii) standard EPA method 1311 of SW 846 modified according to this invention. Particularly, prior to exposing the treated waste material to the extracting fluid, sufficient sodium hydrosulfite was added to the extracting fluid to obtain a dissolved oxygen concentration of less than 0.5 mg/L. Exposure of the treated waste material to the extracting fluid was performed in a ZHE. Further modifying 1311, separation of the extraction fluid from the waste material to form an extract was conducted under nitrogen.

Conclusion

With particular attention paid to the toxic metal cadmium (Cd), the results of this example show that even under extreme acidic extraction conditions metal plating sludge can be effectively stabilized with this invention. The Cd levels in the leachate drop to a twentieth of what it would have been without treatment and tested under standard conditions. In the same vein the extraordinarily high Zn levels were reduced to non-detectable levels using this invention.

Summary of Examples

In all cases, these examples demonstrate that the present invention increases the stability of waste. Specifically, Example 2 demonstrates the excellent stability of waste treated according to this invention when its stability is tested. Moreover, the stability of the waste treated according to this invention, when tested according to the method provided by this invention, is excellent, in that in all but a few cases the amount of metals found in the extract is below detection limits. Furthermore, the anaerobic conditions provided according to this invention have been shown to simulate the conditions waste is exposed to in an actual landfill. Tables 8 and 9 below clearly illustrate the benefits of the present invention by comparing results of simulation according to the present invention with results of simulation according to the prior art.

TABLE 8

Comparison of Landfill Condition Simulations for Waste Treated According to the Present Invention

| | Prepared by Neutral (pH 6) TCLP (Example 2) | | | | Neutral (pH 6) Preparation According to the Present Invention (Example 7) | | | |
|---|---|---|---|---|---|---|---|---|
| | First Extraction | Second Extraction | Third Extraction | Fourth Extraction | First Extraction | Second Extraction | Third Extraction | Fourth Extraction |
| pH | 11.3 | 11.7 | 11.5 | 11.3 | 11.6 | 11.4 | 11.0 | 12.5 |
| ORP (mV) | −388 | −30 | −30 | −35 | −300 | −35 | −50 | −35 |
| Cd (mg/L) | <0.025 | <0.025 | <0.025 | <0.025 | <0.001 | <0.001 | <0.001 | <0.004 |
| Cr (mg/L) | <0.050 | 0.36 | 0.34 | 0.4 | <0.050 | <0.02 | <0.02 | <0.40 |
| Pb (mg/L) | <0.25 | 0.64 | <0.25 | <0.25 | <0.005 | 0.029 | 0.015 | <0.005 |
| Zn (mg/L) | 2 | 0.46 | 0.39 | 0.41 | 2.0 | 0.5 | 0.38 | 0.3 |

TABLE 9

Comparison of Landfill Condition Simulations for Waste Treated According to the Present Invention

| | Prepared by Alkaline (pH 12) TCLP (Example 2) | | | | Alkaline (pH 12) Preparation According to the Present Invention (Example 4) | | | |
|---|---|---|---|---|---|---|---|---|
| | First Extraction | Second Extraction | Third Extraction | Fourth Extraction | First Extraction | Second Extraction | Third Extraction | Fourth Extraction |
| pH | 11.7 | 12.4 | 12.5 | 12.2 | 12.0 | 12.1 | 12.0 | 12.0 |
| ORP (mV) | −395 | −80 | −93 | −131 | −310 | −110 | −85 | −75 |
| Cd (mg/L) | <0.025 | <0.025 | <0.025 | <0.025 | <0.001 | <0.001 | <0.001 | <0.001 |
| Cr (mg/L) | <0.050 | 0.15 | 0.19 | 0.11 | <0.050 | <0.02 | <0.02 | <0.04 |
| Pb (mg/L) | <0.25 | 34 | 14 | 6.2 | <0.005 | 0.031 | 0.021 | <0.025 |
| Zn (mg/L) | 2.8 | 2.6 | 2.5 | 2.6 | 4 | 2.7 | 2.6 | 2.7 |

As Tables 8 and 9 demonstrate, use of the present invention results in lower amounts of contaminants in the leachate. With particular reference to Cr and Pb, when waste is stabilized according to the present invention but extracted using the prior art TCLP, subsequent extractions appear to destabilize the waste causing the Cr and Pb concentrations to increase. However, when the stabilized waste is extracted according to the present invention, the Cr and Pb present in the leachate is significantly reduced. As discussed, the landfill simulation method of the present invention maintains a deoxygenated environment during extraction to simulate the deoxygenated environment of the landfill as exemplified in Example 1. This deoxygenated environment is not maintained by the prior art TCLP simulation and, as a result, the TCLP does not accurately simulate landfill environments. Because the TCLP does not simulate the landfill environment, it should not be relied upon to determine the effectiveness of a waste stabilization process. Waste treated according to the present invention and properly evaluated is clearly stabilized for landfill purposes.

Example 8

Effect of Oxidation-Reduction Potential on Leaching of Metals in Metal Bearing Waste Materials and Methods 1. Treatment of Waste A. 8.3% (wt/wt.) lime and 17% (wt/wt.) water were added to samples of 100 grams of EAF Dust together with sufficient amounts of various stabilization reagents to reduce the oxidation reduction potential of the sample mixtures.

B. A reference sample of 100 grams of EAF dust was mixed into 17% (wt/wt.) water.

C. Another reference sample of 100 grams of EAF dust was mixed with 8.3 (wt/wt.) lime and 17% (wt/wt.) water.

2. Stability Determination of Waste

A. The samples were extracted under various pH conditions according to standard EPA method 1311 of SW 846 and tested for various leachable metals. This data is represented in Table 10.

TABLE 10

Stabilization of Metal Bearing Wastes

| Stabilization Recipe | Extraction pH | Final pH | ORP mV | Cd ppm | Cr ppm | Pb ppm | Zn ppm |
|---|---|---|---|---|---|---|---|
| Raw EAF Dust | 2.88 | 6.6 | 206 | 0.89 | 0.023 | 16 | 390 |
| 17% $H_2O$ | 6.5 | 11.6 | −32 | 0.001 | 0.086 | 4.7 | 1.3 |
|  | 12 | 12.0 | −69 | 0.002 | 0.001 | 34 | 1.7 |
| EAF Dust | 2.88 | 10.2 | 28 | 0.001 | 0.12 | 0.078 | 0.030 |
| 8.3% Miss Lime | 6.5 | 12.4 | −109 | 0.001 | 0.097 | 48 | 2.8 |
| 17% $H_2O$ | 12 | 12.4 | −117 | 0.001 | 0.007 | 46 | 3.1 |
| EAF Dust | 2.88 | 11.6 | −83.1 | 0.003 | 0.012 | 0.69 | 1.5 |
| 8.3% Miss Lime | 6.5 | 12.4 | −123 | 0.002 | 0.008 | 0.083 | 2.9 |
| 5% NaSH 17% $H_2O$ | 12 | 12.5 | −127 | 0.004 | 0.006 | 0.056 | 3.1 |
| EAF Dust | 2.88 | 11.3 | −103 | 0.002 | 0.031 | 2.9 | 1.2 |
| 8.3% Miss Lime | 6.5 | 12.4 | −182 | 0.002 | 0.016 | 53 | 2.8 |
| 5% $N_2H_4$ 17% $H_2O$ | 12 | 12.4 | −248 | 0.003 | 0.008 | 49 | 3.0 |
| EAF Dust | 2.88 | 7.7 | −25 | 0.22 | 0.025 | 0.16 | 88 |
| 8.3% Miss Lime | 6.5 | 12.4 | −133 | 0.003 | 0.18 | 34 | 2.6 |
| 5% $Na_2S_2O_4$ 17% $H_2O$ | 12 | 12.4 | −135 | 0.002 | 0.15 | 31 | 2.8 |
| EAF Dust | 2.88 | 7.3 | 53 | 0.16 | 0.060 | 0.20 | 270 |
| 8.3% Miss Lime | 6.5 | 12.4 | −131 | 0.002 | 0.23 | 31 | 3.1 |
| 5% $NaHSO_3$ 17% $H_2O$ | 12 | 12.4 | −135 | 0.002 | 0.17 | 33 | 3.2 |

Conclusion

As seen from Table 10, all stabilization reagents were successful in lowering the oxidation reduction potential of the leachate to levels below −100 mV for pH 6.5 and 12. However, only the sodium hydrosulfide (NaSH) was successful in stabilizing the metals to below 1 ppm for all extractions. The sodium hydrosulfite ($Na_2S_2O_4$) and the sodium bisulfite ($NaHSO_3$) did reduce the leachable metals over that of lime addition alone, despite having similar oxidation reduction potential values. This data shows that having a low oxidation reduction potential value in the leachate is not necessarily indicative of successful stabilization.

Materials and Methods

1. Treatment of Waste

A. 7.3% (wt/wt.) lime and 17% (wt/wt.) water were added to samples of 100 grams of EAF dust together with various amounts of sodium hydrosulfide (NaSH) to reduce the oxidation reduction potential of extracts of the sample mixtures.

B. A reference sample of 100 grams of EAF dust was mixed with 7.3 (wt/wt.) lime and 17% (wt/wt.) water.

2. Stability Determination of Waste

A. The samples were extracted under various pH conditions according to standard EPA method 1311 of SW 846 and tested for various leachable metals. This data is represented in Table 11.

TABLE 11

Stabilization of Metal Bearing Wastes

| Stabilization Recipe | Extraction pH | Final pH | Sulfide ppm | Cd ppm | Cr ppm | Pb ppm | Zn ppm |
|---|---|---|---|---|---|---|---|
| EAF Dust | 2.88 | 8.4 | 0.15 | 0.097 | 0.015 | 0.12 | 2.3 |
| 7.3% Miss Lime | 6.5 | 12.3 | 0.04 | 0.004 | 0.171 | 56 | 3.0 |
| 17% $H_2O$ | 12 | 12.3 | 0.03 | 0.005 | 0.14 | 58 | 3.1 |
| EAF Dust | 2.88 | 8.7 | 0.22 | 0.007 | 0.008 | 0.19 | 1.7 |
| 7.3% Miss Lime | 6.5 | 12.3 | 0.05 | 0.006 | 0.009 | 22 | 3.0 |
| 0.25% NaSH 17% $H_2O$ | 12 | 12.4 | 0.09 | 0.002 | 0.012 | 18 | 3.1 |
| EAF Dust | 2.88 | 9.6 | 0.19 | 0.002 | 0.011 | 0.11 | 0.007 |
| 7.3% Miss Lime | 6.5 | 12.4 | 1.2 | 0.005 | 0.009 | 0.09 | 3.2 |
| 1% NaSH 17% $H_2O$ | 12 | 12.4 | 1.2 | 0.003 | 0.009 | 0.18 | 3.5 |
| EAF Dust | 2.88 | 10.9 | 0.10 | 0.002 | 0.004 | 0.08 | 0.15 |
| 7.3% Miss Lime | 6.5 | 12.4 | 0.82 | 0.004 | 0.008 | 0.01 | 3.4 |
| 2% NaSH 17% $H_2O$ | 12 | 12.4 | 0.75 | 0.004 | 0.008 | 0.13 | 3.9 |

Conclusion

As seen from Table 11, the first two doses (0%, 0.25%) of NaSH were not successful in stabilizing the EAF dust to leachable metals below 1 ppm, while the last two doses (1%, 2%) were successful. It can be seen from the data in Table 11 that stabilization success correlates with the fact that significant amounts of available sulfide were present only in the pH 6.5 and pH 12 extractions of the last two doses. This suggests indicates that the presence of available sulfide is an indicator of the success of stabilization of the target metals.

The results of this Example can be explained in theory by looking at the solubilities of the metal sulfides formed by the metals as listed in Table 12.

TABLE 12

Solubilities of Metal Sulfides

| Metal Sulfide | Solubility Product (pKsp)* |
|---|---|
| Iron Sulfide (FeS) | 17.2 |
| Zinc Sulfide (α-ZnS) | 23.8 |
| Zinc Sulfide (β-ZnS) | 21.6 |
| Cadmium Sulfide (CdS) | 26.1 |
| Lead Sulfide (PbS) | 27.1 |

*A higher solubility product indicates a lower solubility.

Since in each of the stabilization mixtures tested there are large enough quantities of metal in EAF dust to consume all of the sulfide added, available sulfide will only be present in the leachate as forms of soluble metal sulfides. The cadmium and lead are the first of the target metals to consume sulfide, followed by zinc. The iron is the last to consume sulfide. So, in effect the iron sulfide will only be present after the cadmium, lead and zinc have formed metal sulfides. Since cadmium sulfide, lead sulfide, and zinc sulfide are very insoluble and iron sulfide is relatively more soluble, available sulfide (in the form of soluble iron sulfide) will only be present after all the cadmium, lead and zinc have been stabilized by forming the more insoluble metal sulfides. This explanation is consistent with the results observed in this Example. Therefore, the presence of significant amounts of available sulfide in the leachate can indeed be an indicator of the stabilization of the target metals.

Example 10

Stability of Chromium Bearing Sludge

Materials and Methods
 1. Treatment of Waste
  A. 12% (wt/wt.) lime and 14.2% (wt/wt.) water were added to a sample of 100 grams of chrome sludge together with 5% (wt/wt.) of sodium hydrosulfide (NaSH).
  B. A reference sample of 100 grams of raw chrome sludge was provided.
 2. Stability Determination of Waste
  A. The sample and reference sample were extracted under various pH conditions according to standard EPA method 1311 of SW 846 and tested for various leachable metals. This data is represented in Table 13.

TABLE 13

Stabilization of Metal Bearing Wastes

| Stabilization Recipe | Extraction pH | Final pH | ORP | Cd ppm | Cr ppm | Pb ppm | Zn ppm |
|---|---|---|---|---|---|---|---|
| Raw Chrome Sludge | 2.88 | 4.4 | −109 | 0.001 | 2.1 | 0.10 | 0.004 |
|  | 6.5 | 6.9 | −160 | 0.002 | 0.001 | 0.06 | 0.021 |
|  | 12 | 8.3 | −146 | 0.001 | 0.001 | 0.03 | 0.022 |
| Chrome Sludge 12% Miss Lime 5% NaSH 14.2% H$_2$O | 2.88 | 7.9 | −455 | 0.001 | 0.007 | 0.09 | 0.023 |
|  | 6.5 | 11.8 | −560 | 0.001 | 0.005 | 0.09 | 0.020 |
|  | 12 | 12.0 | −555 | 0.001 | 0.003 | 0.06 | 0.023 |

Conclusion

The results in this example demonstrate that the chrome bearing sludge can be stabilized according to the present invention. As seen, the stabilization method was successful in stabilizing chrome in the sludge to very low levels compared to the raw sample without stabilization.

Examples 8–10 demonstrate that when treating with sulfide either measurement of available sulfide or ORP can be indicative of successful stabilization. In the above Example it has been observed that while available sulfide can produce very low ORP values, other constituents which could be present in a waste can lower ORP values without stabilizing target metals. Indeed, since oxidation can consume sulfide that might otherwise be used to stabilize target metals, it should be necessary to keep the sulfide in a reducing form so as to be available to be consumed by the metals. This suggests that while a low ORP value may be necessary for successful stabilization by sulfide, a low ORP value in and of itself does not indicate successful stabilization. The presence of available sulfide is a better indicator of successful stabilization. Example 10 indicates that the stabilization process can be successful on other types of metal bearing wastes with higher concentrations of chromium.

Additional objects, advantages and other novel features of the invention will become apparent to those skilled in the art upon examination of the foregoing or may be learned with practice of the invention. The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustrations of the principles of the invention and their practical application, thereby enabling one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for stabilizing metal bearing waste comprising:
   providing a metal bearing waste;
   adjusting the pH of the metal bearing waste with a pH adjusting substance so that an extract from the metal bearing waste will have a pH of from about 8.5 to about 12.5; and
   adding sufficient sulfide containing reducing agent to the metal bearing waste to reach an oxidation reduction potential less than about 50 mV in an extract from the metal bearing waste.

2. The method of claim 1, wherein the metal bearing waste comprises electric arc furnace dust.

3. The method of claim 1, wherein the pH adjusting substance comprises an acid.

4. The method of claim 3, wherein the pH adjusting substance comprises at least one of HCl, $H_2SO_4$ and $H_3PO_4$.

5. The method of claim 1, wherein the pH adjusting substance comprises a base.

6. The method of claim 1, wherein a sufficient amount of the sulfide containing reducing agent is added so that free sulfide exists in the metal bearing waste.

7. The method of claim 1, wherein the reducing agent comprises at least one of sodium hydrosulfide, calcium polysulfide, and ferrous sulfide.

8. The method of claim 1, wherein an extract from the metal bearing waste will have a pH of from about 8.5 to about 12.5 under anaerobic conditions.

9. A method for simulating landfill conditions for assessing the leachability of metal bearing waste, comprising:
providing a metal bearing waste;
preparing deoxygenated extracting fluid; exposing the metal bearing waste to the extracting fluid under anaerobic conditions;
separating the metal bearing waste from the extracting fluid under anaerobic conditions to form a leachate; and
assaying the leachate.

10. The method of claim 9, wherein the step of preparing the extracting fluid comprises adding a deoxygenating agent to the extraction fluid.

11. The method of claim 10, wherein the deoxygenating agent comprises sodium sulfite.

12. The method of claim 9, wherein the step of preparing the extracting fluid comprises purging the extracting fluid wit a deoxygenating gas.

13. The method of claim 12, wherein the deoxygenating gas comprises at least one of nitrogen, neon, helium and argon.

14. The method of claim 9, wherein the step of exposing the metal bearing waste to the extracting fluid under anaerobic conditions occurs in a container without headspace.

15. The method of claim 9, wherein the leachate is formed in a nitrogen atmosphere.

16. A method for stabilizing metal bearing waste and simulating the leaching of the waste comprising:
providing a metal bearing waste;
preparing an extracting fluid;
exposing the metal bearing waste to the extracting fluid under anaerobic conditions;
separating the metal bearing waste from the extracting fluid under anaerobic conditions to form a leachate;
assaying the leachate;
adjusting the pH of the metal bearing waste with a pH adjusting substance so that the leachate has a pH from about 8.5 to about 12.5; and
adding sufficient sulfide containing reducing agent to the metal bearing waste so that the leachate has an oxidation reduction potential less than about 50 mV.

17. The method of claim 16, wherein the metal bearing waste comprises electric arc furnace dust.

18. The method of claim 16, wherein the pH adjusting substance comprises an acid.

19. The method of claim 18, wherein the pH adjusting substance is at least one of HCl, $H_2SO_4$ and $H_3PO_4$.

20. The method of claim 16, wherein the pH adjusting substance comprises a base.

21. The method of claim 16, wherein excess sulfide containing reducing agent is added to provide free sulfide in the metal bearing waste.

22. The method of claim 21, wherein the sulfide containing reducing agent comprises at least one of sodium hydrosulfide, calcium polysulfide, and ferrous sulfide.

23. The method of claim 16, further comprising adding a deoxygenating agent to the metal bearing waste.

24. The method of claim 23, wherein the deoxygenating agent comprises sodium sulfite.

25. The method of claim 16, wherein the extracting fluid is deoxygenated.

26. The method of claim 25, wherein the extracting fluid is deoxygenated with a deoxygenating agent.

27. The method of claim 26, wherein the deoxygenating agent comprises sodium sulfite.

28. The method of claim 16, wherein the step of preparing the extracting fluid comprises purging the extracting fluid with a deoxygenating gas.

29. The method of claim 28 wherein the deoxygenating gas comprises at least one of nitrogen, neon, helium and argon.

30. The method of claim 16, wherein the step of exposing the metal bearing waste to the extracting fluid under anaerobic conditions occurs in a container without headspace.

31. The method of claim 16, wherein the leachate is formed in a nitrogen atmosphere.

* * * * *

UNITED STATES PATENT AND TRADEMARK OFFICE
CERTIFICATE OF CORRECTION

PATENT NO.    : 6,991,593 B2
DATED         : January 31, 2006
INVENTOR(S)   : Price et al.

It is certified that error appears in the above-identified patent and that said Letters Patent is hereby corrected as shown below:

Page 27,
Line 35, delete "wit" and insert -- with --.

Signed and Sealed this

Eighteenth Day of April, 2006

JON W. DUDAS
*Director of the United States Patent and Trademark Office*